United States Patent
Fürst et al.

(10) Patent No.: US 11,233,461 B2
(45) Date of Patent: Jan. 25, 2022

(54) MODULAR CONVERTER AND MODULAR CONVERTER SYSTEM

(71) Applicant: Siemens Aktiengesellschaft, Munich (DE)

(72) Inventors: Johannes Fürst, Stöckelsberg (DE); Fabian Diepold, Altmannstein (DE)

(73) Assignee: Siemens Aktiengesellschaft, Munich (DE)

(*) Notice: Subject to any disclaimer, the term of this patent is extended or adjusted under 35 U.S.C. 154(b) by 6 days.

(21) Appl. No.: 16/649,649

(22) PCT Filed: Sep. 13, 2018

(86) PCT No.: PCT/EP2018/074714
§ 371 (c)(1),
(2) Date: Mar. 21, 2020

(87) PCT Pub. No.: WO2019/063303
PCT Pub. Date: Apr. 4, 2019

(65) Prior Publication Data
US 2020/0321883 A1    Oct. 8, 2020

(30) Foreign Application Priority Data

Sep. 29, 2017 (EP) ..................................... 17194124

(51) Int. Cl.
*H02M 7/00* (2006.01)
*H02M 1/44* (2007.01)
*H02M 5/458* (2006.01)

(52) U.S. Cl.
CPC ............. *H02M 7/003* (2013.01); *H02M 1/44* (2013.01); *H02M 5/4585* (2013.01)

(58) Field of Classification Search
CPC ....... H02M 7/003; H02M 5/4585; H02M 1/44
See application file for complete search history.

(56) References Cited

U.S. PATENT DOCUMENTS

2003/0036806 A1* 2/2003 Schienbein ............... H02J 4/00
                                                              700/1
2005/0189889 A1   9/2005 Armes et al.
(Continued)

FOREIGN PATENT DOCUMENTS

DE        202015105561 U1    11/2015

OTHER PUBLICATIONS

PCT International Preliminary Examination Report and Written Opinion of International Examination Authority dated Dec. 16, 2019 corresponding to PCT International Application No. PCT/EP2018/074714 filed Sep. 13, 2018.

*Primary Examiner* — Jue Zhang
(74) *Attorney, Agent, or Firm* — Henry M. Feiereisen LLC

(57) ABSTRACT

A modular converter includes an inverter having power semiconductor switches made of GaN or InGaN and being operated with a blocking voltage of at least 400V and with a clock frequency of at least 40 kHz. A connection assembly distributes input and output signals and input and output AC voltages. A control assembly generates control signals for the inverter, a supply assembly with a rectifier converts the input alternating voltage into an intermediate circuit voltage, a rear wall assembly distributes the intermediate circuit voltage and the control signals for the inverter, and a load assembly converts the intermediate circuit voltage into the output alternating voltage for a load or for a secondary network. The connection assembly and the rear wall assembly are electrically connected to the other assemblies by way of releasable mechanical connections. A modular converter system that uses the modular inverter is also described.

14 Claims, 4 Drawing Sheets

(56) References Cited

U.S. PATENT DOCUMENTS

| | | | |
|---|---|---|---|
| 2007/0046252 A1* | 3/2007 | Aiello | H02M 7/003 |
| | | | 320/101 |
| 2009/0109713 A1* | 4/2009 | Schnetzka | H02M 5/4585 |
| | | | 363/34 |
| 2011/0110021 A1 | 5/2011 | Briag et al. | |
| 2019/0267482 A1* | 8/2019 | Udrea | H01L 27/0605 |

* cited by examiner

MODULAR CONVERTER AND MODULAR CONVERTER SYSTEM

CROSS-REFERENCES TO RELATED APPLICATIONS

This application is the U.S. National Stage of International Application Na. PCT/EP 2018/074714, filed Sep. 13, 2018, which designated the United States and has been published as International Publication No. WO 20191063303 A1 and which claims the priority of European Patent Application, Ser. No. 17194124.8, filed Sep. 29, 2017, pursuant to 35 U.S.C. 119(a)-(d).

BACKGROUND OF THE INVENTION

The Invention relates to a modular converter, having a connection assembly, a control assembly, a supply assembly, a rear wall assembly and a load assembly, as well as a modular converter system with the modular converter, a rear wall bus and a converter expansion module.

Electrical converters which today usually have power semiconductor switches or power modules with silicon-based power semiconductor switches arranged in bridge circuits (e.g. Si or SIC), usually require a solid metallic heat sink for heat dissipation with regard to operational heat losses. This is particularly the case when the conventional power semiconductor switches are to be operated with high reverse voltages, for example, greater than 400V, at high clock frequencies, for example, greater than 40 kHz, and with switching currents, for example, greater than 7A.

The essential structural components from which such electrical converters, in particular frequency converters with a DC link, are formed today, relate only to a few basic converter components, such as the power component, consisting of the power module for the direct and alternating direction, the solid metallic heat sink for heat dissipation of the power semiconductor switches of the power module and the control unit for controlling the inverter or the rectifier (for example, in the case of self-commutated rectifiers). These basic converter components essentially form the core, which can be changed only in a few degrees of freedom, of the electrical converter today, which, in contrast, remains largely unchanged in terms of its structural degrees of freedom over many converter types and generations.

For example, the power module for this purpose is, on the one hand, usually directly connected to the solid metallic heat sink and, on the other hand, as far as possible directly contacts the power circuit board which, inter alia, contains the control electronics for the power semi-conductor switch.

In today's converter solutions, the solid metallic heat sink also generally assumes the function of a converter housing, either completely or as part of the converter housing, which additionally restricts flexibility in design adaptations or changes with regard to the creation of further functionality of these electrical converters due to the extensive changes which are then to be carried out, in particular with regard to their converter components.

Currently, encapsulated power modules are used for most power classes so that in terms of design, i.e. from the point of view of the space requirement and the heat balance, but also electrically, i.e. from the point of view of the inductive and ohmic connection, as central converter components, these power modules result in high development costs for each device size and a considerable outlay in production.

A problem for users is therefore that only limited possibilities exist for adapting the converter products to specific customer requirements. Thus, in particular for drive converters, there are various fields of application and thus also different electrotechnical requirements for these electrical converters, such as, for example, with regard to their overload capability, electromagnetic compatibility (EMC) and specific network connection requirements.

Nevertheless, in order to meet as many of these requirements as possible, the converter types currently offered are designed in such a way that they often include a multiplicity of functions. In this way, they are usually over-dimensioned and cost-intensive, which means that customers must acquire technical functions which are not required. Apart from this, the size of the construction space, combined with a compact, flexible structure, is increasingly decisive for the suitability of such electrical converters when used in innovative plant and mechanical engineering technologies.

However, problems arise here, for example, if the control unit, as is customary, has been designed to regulate the inverter or rectifier for all performance classes. In a further development, in the case of adaptations or changes, a multiplicity of technical/technological functions of the converter components of the electrical converter must often be considered and revised or even completely redeveloped.

In this connection, parallel switching of power modules for example can be achieved only through a high outlay in changing the control of the inverter or rectifier, in particular in the layout of the control unit.

A parallel operation of individual converters is for example, scarcely possible nowadays without external inductances, which could lead to a demand for integration of such inductances into current electrical converters by users. For the user, however, this option is again not of great interest due to the high development and implementation costs that have to be paid for such labor-intensive design changes via the converter products, the time cycle until the changed converter product is available also being considered to be rather lengthy.

The object of the invention is therefore to provide electrical converter and converter systems which can be combined in modular form and which meet technical/functional user requirements by means of flexibly combinable electronic assemblies or converter components and at the same time enable a space-saving and more compact design of the electrical converter, including in combination with converter systems, compared to the state of the art.

SUMMARY OF THE INVENTION

According to one aspect of the invention, the object is achieved by a modular converter having a connection assembly, a control assembly, a supply assembly, a rear wall assembly and a load assembly, wherein an input and an output signal and an input and an output alternating voltage can be distributed by means of the connection assembly, first control signals for an inverter can be generated by a control unit of the control, assembly, the input alternating voltage of a primary network can be converted into an intermediate circuit direct voltage by means of a rectifier of the supply assembly;

the intermediate circuit direct voltage and the first control signals for the inverter can be distributed by means of a DC link and a control signal circuit of the rear wall assembly, the intermediate circuit direct voltage can be converted into the output alternating voltage for a load or secondary network by means of the inverter of the load assembly, inverter has switches which are made of GaN or InGaN and which can be operated with a blocked voltage of at least 400V and with a clock frequency of at least 40 kHz, and the connection assembly and the rear wall assembly are each electrically connected to the control assembly, the supply assembly and the load assembly (6) by means of releasable mechanical connection.

The invention is based, inter alia, on the finding that, with the introduction of power semiconductor switches having a high bandwidth made of GaN or InGaN, which are operated in particular with high blocking voltages (>400V) and high clock frequencies (>40 kHz) in the case of switching currents greater than 7A, it is possible to dispense with solid metallic heat sinks used hitherto, which until now have often been completely or at least partially integrated into the housing chassis and/or into the housing cover of the electrical converter, on account of new cooling concepts or to substantially reduce the heat sinks used at least with respect to their space and material requirements.

This in turn opens up new options for the flexible use of technical/technological, i.e. functionally encapsulated electronic assemblies in modular converters or in converter systems with modular converters. Across performance class-defined converter limits, the electronic assemblies for the modular converter can be scaled with less effort and thus be used more cost-effectively.

A more compact arrangement by means of new construction concepts of such functionally designed electronic assemblies can also result in new possibilities for the use of these modular converters in previous as well as new fields of application.

A modular converter is proposed for achieving the object, which comprises a connection assembly, a control assembly, a supply assembly, a rear wall assembly and a load assembly, wherein an input signal and an output signal and an input and an output alternating voltage can be distributed by means of the connecting structure, wherein first control signals for an inverter can be generated by means of a control unit of the control assembly, wherein the input alternating voltage of a primary network can be converted into an intermediate circuit direct voltage by means of a rectifier of the supply assembly, wherein the intermediate circuit direct voltage and the first control signals for the inverter can be distributed by means of a DC link and a control signal circuit of the rear wall assembly, wherein the intermediate circuit direct voltage can be converted into the output alternating voltage for a load or a secondary network by means of the inverter of the load assembly, wherein the inverter has power semiconductor switches made of GaN or InGaN, which can be operated with a blocking voltage of at least 400V and at a clock frequency of at least 40 kHz, and wherein the connection assembly and the rear wall assembly are each electrically connected to the control assembly, the supply assembly and the load assembly by means of releasable mechanical connections.

When using power semiconductor switches made of GaN or InGaN, which lead to significantly less heat loss at high blocking voltages and clock frequencies in comparison with silicon-based power semiconductor switches, it is possible to dispense with a solid metallic heat sink—as the central converter component of electrical converters previously determining the mechanical structure and requiring considerable installation space—through new cooling concepts.

It has been recognized in an advantageous manner that more degrees of freedom are now possible for restructuring a technically/technologically or request-related functional encapsulation of assemblies.

By means of the functional components of the modular converter which are encapsulated in their functional performance, technical/technological tasks which can be limited in this way and electronic components required for this purpose can be scaled within the modular converter to the requirements of users, can be developed with little effort and can be advantageously replaced in a cost-effective manner with a mechanical design of the modular converter which can now be realized in compact form.

The proposed assemblies of the modular converter thus form the basis for a modular design of electrical converters. Each of the assemblies can be developed as required, in its own right, or in conjunction with the modular converter.

This relates not only to the adaptation of the technical/technological functionality of the assemblies, but also to the optimization/generation of fields of application of the modular converter (e.g. the operation of multi-axis drives or supply to different electrical networks), the installation space optimization of the modular converter, the optimization of the transmission of signals and electrical power, the optimization of material requirements with regard to the electronic components and the optimization of the low-cost and cost-effective replaceability of the assemblies for maintenance or upgrade possibilities.

Advantageous embodiments of the modular converter are indicated in the dependent claims.

In a first advantageous embodiment of the modular converter according to the invention, the rectifier has power semiconductor switches made of GaN or InGaN which can be operated with a blocking voltage of at least 400V and with a clock frequency of at least 40 kHz.

In addition to the externally controlled rectifiers, a self-commutated rectifier can also be operated here by means of the power semiconductor switches used, which advantageously increases the quality of the intermediate circuit direct voltage which can be generated on the DC link.

In a further advantageous embodiment of the modular converter according to the invention, the second control signals for the rectifier can be generated by means of the control unit of the control assembly and the second control signals for the rectifier can be distributed by means of the control signal circuit of the rear wall module.

In a further advantageous embodiment of the modular converter according to the invention, the modular converter has a capacitor assembly with an intermediate circuit capacitor and/or with a commutation capacitor, wherein the capacitor assembly is electrically connected at least to the rear wall assembly by means of releasable mechanical connections.

By means of the independently available and scalable capacitor assembly, it is possible to provide different capacitors in terms of their type and performance variable for the specific application requirements of the modular converter in an advantageous manner in the form of low-cost original equipment or component adaptation. For example, there are applications in which, in addition to the intermediate circuit capacitor arranged directly on the DC link on the rear wall assembly, a commutation capacitor for fast commutation processes by means of the capacitor assembly is arranged in the modular converter.

In a further advantageous embodiment of the modular converter according to the invention, the modular converter has an EMC assembly with an LC filter circuit, wherein the EMC assembly is electrically connected at least to the connection assembly by means of one of the releasable mechanical connections.

Such an EMC assembly can be arranged electrically both on the AC voltage side in front of the supply assembly, on the DC voltage side on the DC link of the rear wall assembly between the supply assembly and the load assembly, or alternatively on the AC voltage side on the load assembly in an advantageous manner.

In a further advantageous embodiment of the modular converter according to the invention, the modular converter has a further supply assembly with a further rectifier, wherein the further supply assembly is electrically connected to the first connection assembly and the first rear wall assembly by means of releasable mechanical connections.

By means of this further supply assembly, the modular converter can, for example, advantageously regulate its supply power on the electrical input side (the supply side) of the modular converter by switching the further rectifier on and off. If the further rectifier is, for example, a self-commutated rectifier, a high scalability of the regulation of the supply power can be generated.

In a further advantageous embodiment of the modular converter according to the invention, the modular converter has a further load assembly with a further inverter, wherein the further load assembly is electrically connected to the connection assembly and the rear wall assembly by means of releasable mechanical connections.

By means of this further load assembly, the modular converter can, for example, advantageously regulate its output power on the electrical output side (the load side) of the modular converter by switching the further inverter on and off.

In a further advantageous embodiment of the modular converter according to the invention, the load or the secondary network can be operated jointly by means of the inverter of the load assembly and the further inverter of the further load assembly.

In a further advantageous embodiment of the modular converter according to the invention, the load or the secondary network can be operated by means of the inverter of the load assembly and a further load or a further secondary network can be operated by means of the further inverter of the further load assembly.

In a further advantageous embodiment of the modular converter according to the invention, the releasable mechanical connections are designed as screwless plug connections.

This advantageous embodiment of the modular converter according to the invention makes it possible to further advantageously reduce the installation space for the mechanical connections of the assemblies to one other. This also enables closer interleaving of the assemblies.

In a further advantageous embodiment of the modular converter according to the invention, the power semiconductor switches can be operated with a switching current of at least 7A.

According to another aspect of the invention, the object is achieved by, a modular converter system, which comprises a modular converter according to the invention, a rear wall bus and a converter expansion module having a module connection assembly, a module coupling assembly, a module rear wall assembly and a module load assembly, wherein module input and output signals and a module output alternating voltage can be distributed by means of the module connection assembly, wherein fourth control signals, which can be generated in the control unit of the control assembly of the modular converter or in a module control unit of the module coupling assembly, can be distributed for a module inverter by means of the module coupling assembly, wherein the module intermediate circuit direct voltage and the fourth control signals for the module inverter can be distributed by means of a module DC link and a module control signal circuit of the module rear wall assembly, wherein the module intermediate circuit direct voltage can be converted into the module output alternating voltage for a module load or a module secondary network by means of the module inverter of the module load assembly, wherein power semiconductor switches of the module inverter are made of GaN or InGaN and can be operated with a blocking voltage of at least 400V and with a clock frequency of at least 40 kHz and wherein the module connection assembly and the module rear wall assembly are each electrically connected to the module coupling assembly and the module load assembly by means of releasable mechanical module connections.

The modular converter system enables the assemblies of the modular converter to be expanded as required by the module assemblies, which are arranged in the converter expansion module. In this case, the spatial arrangement of the modular converter and the converter expansion module can be both centralized and decentralized in design, only requiring an interpretation of the rear wall bus with regard to its rear wall bus direct voltage circuit and its rear wall bus control signal circuit.

In a first advantageous embodiment of the modular converter system, the intermediate circuit direct voltage of the DC link of the modular converter can be distributed to the module DC link of the converter expansion module as a module intermediate circuit direct voltage for the module inverter by means of the rear wall bus via its rear wall bus DC circuit and the fourth control signals can be distributed by the control signal circuit of the modular converter to the module control signal circuit of the converter expansion module for the module inverter by means of the rear wall bus via its rear wall bus control signal circuit.

Accordingly, the rear wall bus advantageously transmits not only the fourth control signals of the control signal circuit of the modular converter to the module inverter of the converter expansion module, but also provides the intermediate circuit direct voltage of the DC link of the modular converter to the module inverter. Accordingly, in addition to the control signals, the power for the module inverter of the converter expansion module is also supplied by the modular converter which the rectifier of the supply assembly of the modular converter generates during operation.

In a further advantageous embodiment of the modular converter system, the converter expansion module has a further module load assembly with a further module inverter, wherein the module connection assembly and the module rear wall assembly are electrically connected to the further module load assembly by means of releasable mechanical module connections.

In a further advantageous embodiment of the modular converter system, the rear wall bus is electrically connected to the electrical converter and the converter expansion module by means of releasable mechanical rear wall bus connections and the releasable mechanical module connections and the releasable mechanical rear wall bus connections are designed as screwless plug connections.

This advantageous embodiment of the modular converter system according to the invention makes it possible to advantageously reduce the installation space for the mechanical connections of the modular converter to the converter expansion module. This also enables closer interleaving of the components of the modular converter system.

BRIEF DESCRIPTION OF THE DRAWING

The properties, features and advantages of this invention described above, as well as the manner in which these are achieved, will be more clearly understood in connection with the following description of the exemplary embodiments, which are explained in more detail in connection with the figures, in which.

DETAILED DESCRIPTION OF PREFERRED EMBODIMENTS

Figure 1:
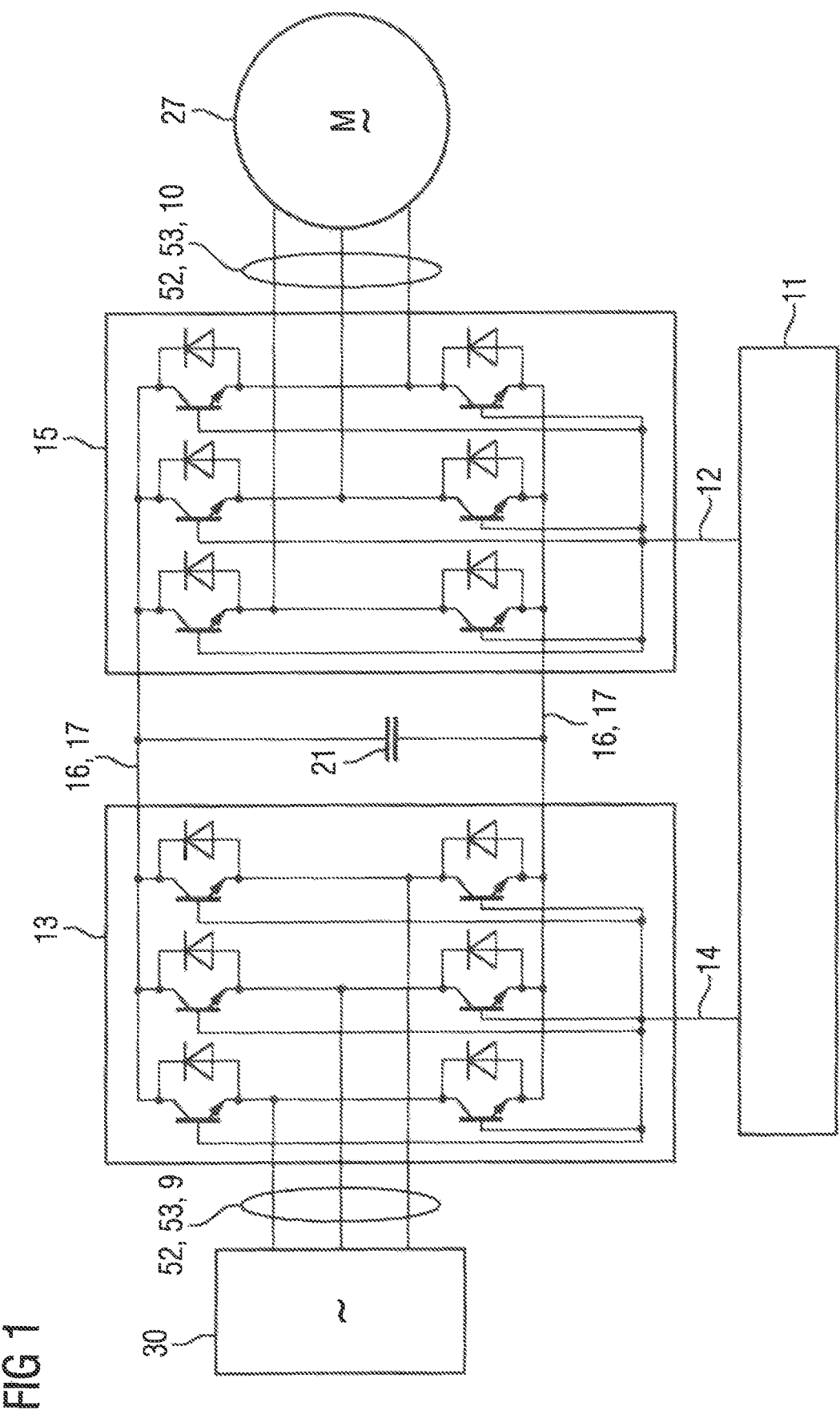
FIG. 1 shows a schematic representation of an electrical converter according to the prior art.

This electrical converter has, as converter components, at least one rectifier 13 with power semiconductor switches, a DC link 17 with an intermediate circuit capacitor 21, an inverter 15 with power semiconductor switches and a control unit 11 for controlling the power semiconductor switches.

A primary network 30 which in this case is connected to the rectifier 13 of the electrical converter by means of three-phase AC voltage lines 53 of a three-phase supply via AC voltage connections 52, provides an input alternating voltage 9 for operating the electrical converter during operation.

The rectifier 13 converts the three-phase input alternating voltage 9 of the primary network 30 into an intermediate circuit direct voltage 16 in the DC link 17. For this purpose, the power semiconductor switches of the rectifier 13 are switched by means of second control signals 14 generated by the control unit 11.

For sufficient buffering and smoothing of the intermediate circuit direct voltage 16, the intermediate circuit capacitor 21 operates on the DC link 17 of the electrical converter. The intermediate circuit direct voltage 16 in turn is converted by means of the inverter 15 into a three-phase output alternating voltage 10 of a further three-phase network. For this purpose, the power semiconductor switches of the inverter 15 are switched by means of first control signals 12 generated by the control unit 11.

The inverter 15 is connected via its AC voltage connections 52 and AC voltage lines 53 to a load 27, in this case an electrical three-phase machine, which, during operation, is supplied with electrical energy by the electrical converter and thus operated.

A division of the technical/technological functions of such an electrical converter takes place in known electrical converters at different levels of the hardware and software, partly distributed over a plurality of said converter components. Here too, there is generally no hierarchical, structural design, encapsulated in independent functional assemblies, which would be to be expected in view of the electrical circuit diagram of the schematic representation of FIG. 1.

Figure 2:
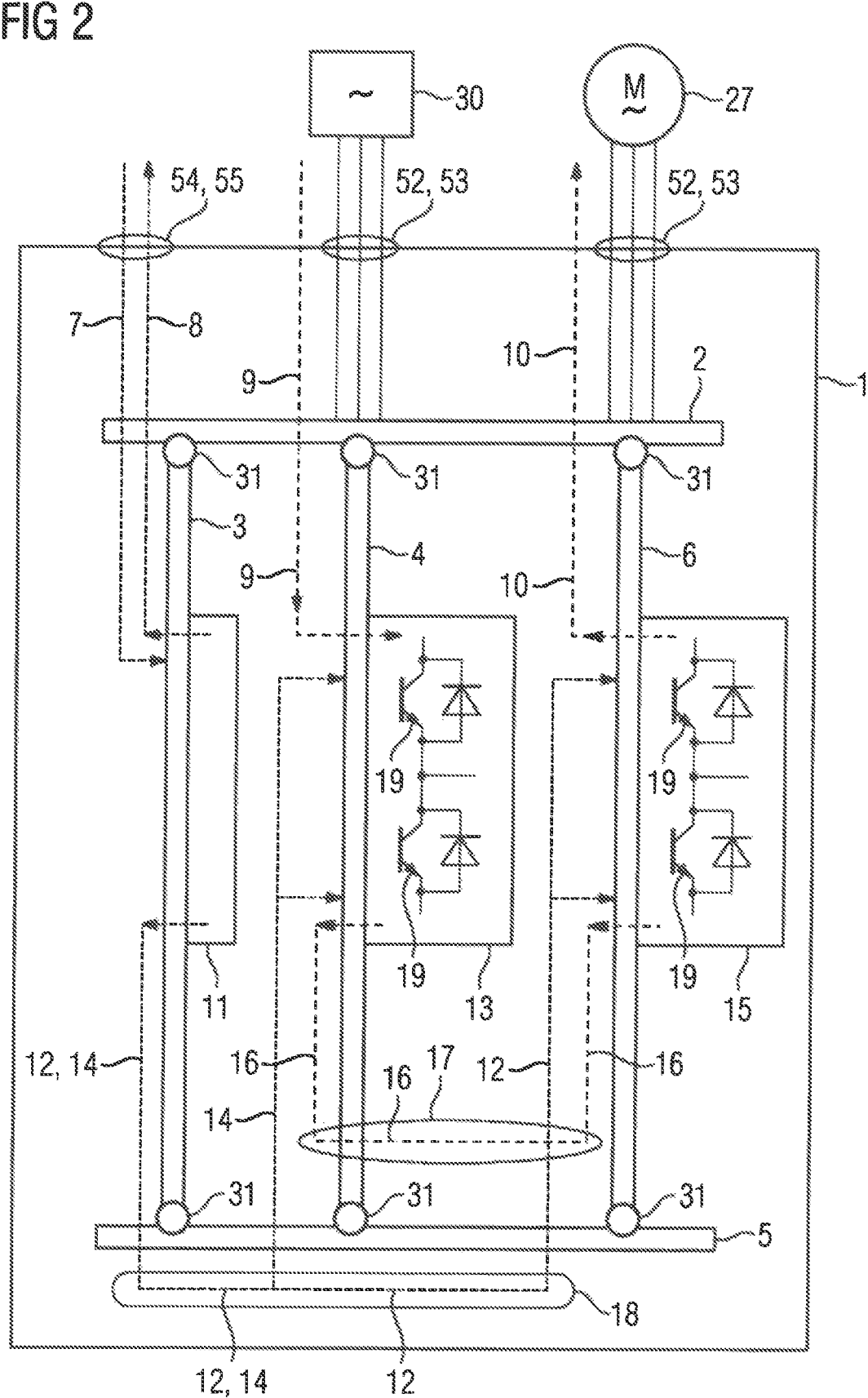
FIG. 2 shows a first schematic representation of the modular converter according to the invention.

FIG. 2 shows a first schematic representation of the modular converter 1 according to the invention.

The modular converter 1 has a connection assembly 2, a control assembly 3, a supply assembly 4, a rear wall assembly 5 and a load assembly 6 as assemblies or converter components, wherein the connection assembly 2 and the rear wall assembly 5 are each electrically connected to the control assembly 3, the supply assembly 4 and the load assembly 6 by means of releasable mechanical connections 31.

An input and an output signal 7,8 are received respectively and output by the connection assembly 2 here, for example by means of signal lines 55 and signal connections 54 of the modular converter 1. Via these signals 7,8, the modular converter 1 can, for example, communicate with superimposed drive control systems, superimposed network controllers or automation systems, but also with actuators (for example, circuit breakers) and sensors (for example, speed sensors), which may be necessary for its drive control, and output or receive corresponding information.

The input signal 7, coming from a sensor, for example, is distributed via the connection assembly 2 to within the modular converter 1 for further processing in a control unit 11 of the control assembly 3. The output signal 8 going to an actuator, for example, is distributed coming from the control unit 11 of the control assembly 3 via the connection assembly 2 to the outside of the modular converter 1 for further processing.

Furthermore, by means of the connection assembly 2 in FIG. 2, for example, an input and an output alternating voltage 9,10 are distributed to the inside and to the outside of the modular converter 1.

Coming from a primary network 30, here designed as a three-phase network, an input alternating voltage 9 is applied via, in this case, three-phase AC voltage lines 53 and AC voltage connections 52 to the modular converter 1 and is distributed by means of the connection assembly 2 to a rectifier 13 of the supply assembly 4.

The control unit 11 of the control assembly 3 generates second control signals 14 for power semiconductor switches 19 of the rectifier 13, wherein the second control signals 14 are distributed to the rectifier 13 via a control signal circuit 18 of the rear wall assembly 5.

During operation, the rectifier 13 converts the input alternating voltage 9 of the primary network 30 into an intermediate circuit direct voltage 16 of a DC link 17, which is arranged on the rear wall assembly 5, this intermediate circuit direct voltage 16 being distributed by means of the DC link 17 on the rear wall assembly 5 to an inverter 15 of the load assembly 6.

The inverter 15 of the load assembly 6 converts the intermediate circuit direct voltage 16 of the DC link 17 by means of the first control signals 12 generated in the control unit 11 of the control assembly 3 for the power semiconductor switch 19 of the inverter 15 into the output alternating voltage 10 for the operation of a load 27, in this case an electrical three-phase machine. The first control signals 12 are distributed over the control signal circuit 18 of the rear wall assembly 5 to the inverter 15 on the load assembly 6. The output alternating voltage 10 on the inverter 15 is further distributed over the connection assembly 2 and AC voltage lines 53 and AC voltage connections 52 to the load 27.

The power semiconductor switches 19 of the rectifier 13 and the inverter 15 are made of GaN or InGaN and are operated with a blocking voltage of at least 400V and with a clock frequency of at least 40 kHz during operation.

Figure 3:
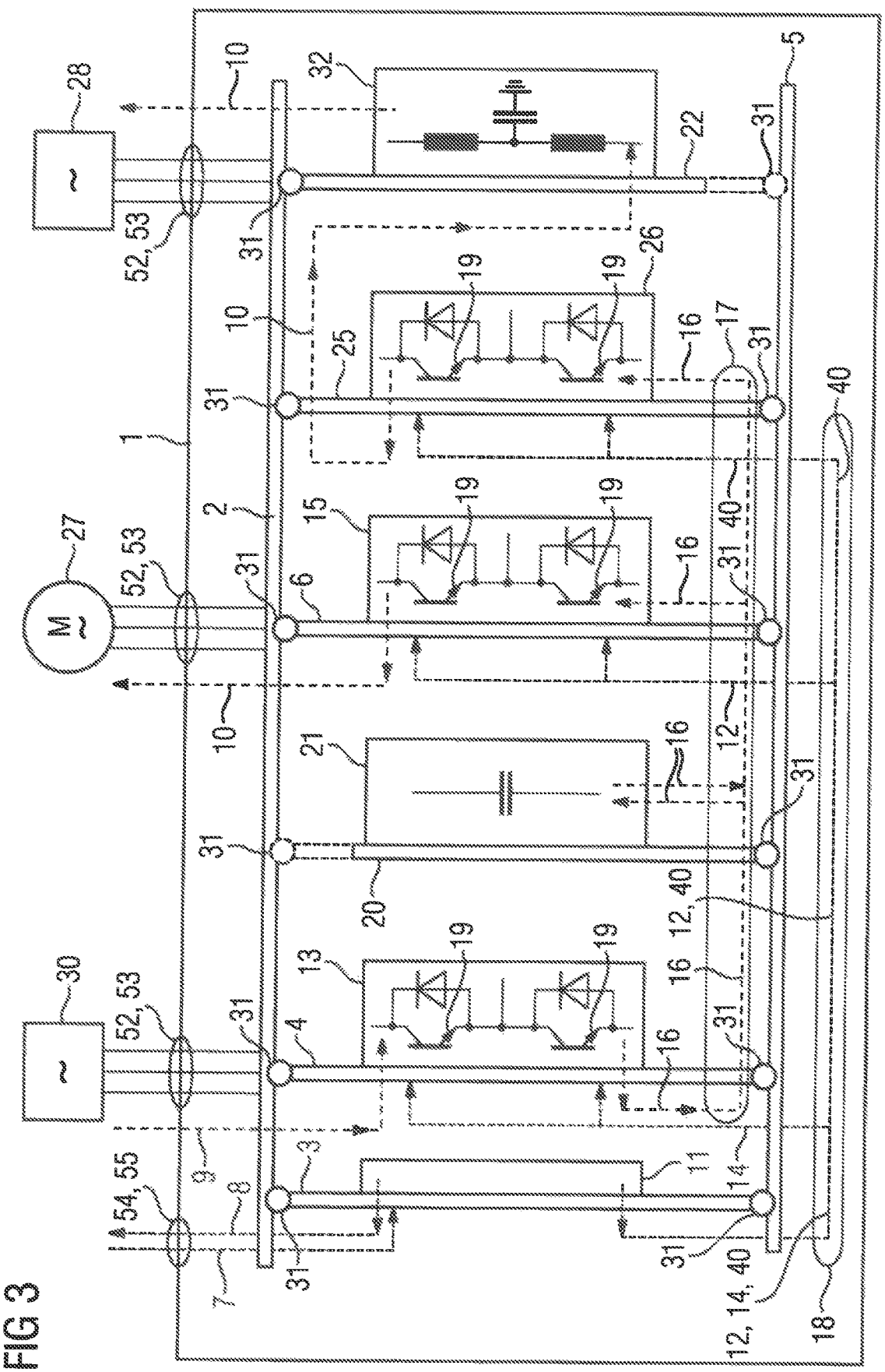
FIG. 3 shows a further schematic representation of the modular converter according to the invention according to FIG. 2.

FIG. 3 discloses a further schematic representation of the modular converter 1 according to the invention according to FIG. 2.

Besides the assemblies of the modular converter 1 shown and functionally described in FIG. 2, a capacitor assembly 20 with an intermediate circuit capacitor 21, a further load assembly 25 with a further inverter 26 and an EMC assembly 22 with an LC filter circuit 32 are also shown in FIG. 3.

The capacitor assembly 20 is electrically connected at least to the rear wall assembly 5 by means of releasable mechanical connections 31, the further load assembly 25 is electrically connected to the connection assembly 2 and the rear wall assembly 5 by means of releasable mechanical connections 31 and the EMC assembly 22 is electrically connected at least to the connection assembly 2 by means of releasable mechanical connections 31.

During operation, the intermediate circuit direct voltage 16 of the DC link 17 of the rear wall assembly 5 is electrically applied to the intermediate circuit capacitor 21 of the capacitor assembly 20. Structurally, the capacitor assembly 20 is arranged between the supply assembly 4 with the rectifier 13 and the load assembly 6 with the inverter 15.

During operation, the intermediate circuit direct voltage 16 of the DC link 17 of the rear wall assembly 5 is also electrically applied to the further inverter 26 of the further load assembly 25 on the input side and the output alternating voltage 10 generated by the further inverter 26 itself is applied on the output side. Structurally, the further load assembly 25 is arranged between the load assembly 6 with the inverter 15 and the EMC assembly 22 with the LC filter circuit 32.

During operation, the output alternating voltage 10 generated by the further inverter 26 is electrically applied to the LC filter circuit 32 of the EMC assembly 22. Structurally, the EMC assembly 22 is arranged after the further load assembly 25 with the further inverter 26.

By means of the third control signals 40 generated in the control unit 11 of the control assembly 3 for the power semiconductor switches 19 of the further inverter 26 of the further load assembly 25, the power semiconductor switches 19 are actuated for the generation of the output alternating voltage 10. These third control signals 40, coming from the control unit 11 of the control assembly 3, are distributed via the control signal circuit 18 of the rear wall assembly 5 to the further inverter 26 on the load assembly 25.

The output alternating voltage 10 converted from the intermediate circuit voltage 16 by the further inverter 26 of the further load assembly 22 is distributed to a further secondary network 28 via the LC filter circuit 32 of the EMC assembly 22, the connection assembly 2 as well as AC voltage lines 53 and AC voltage connections 52.

Figure 4:
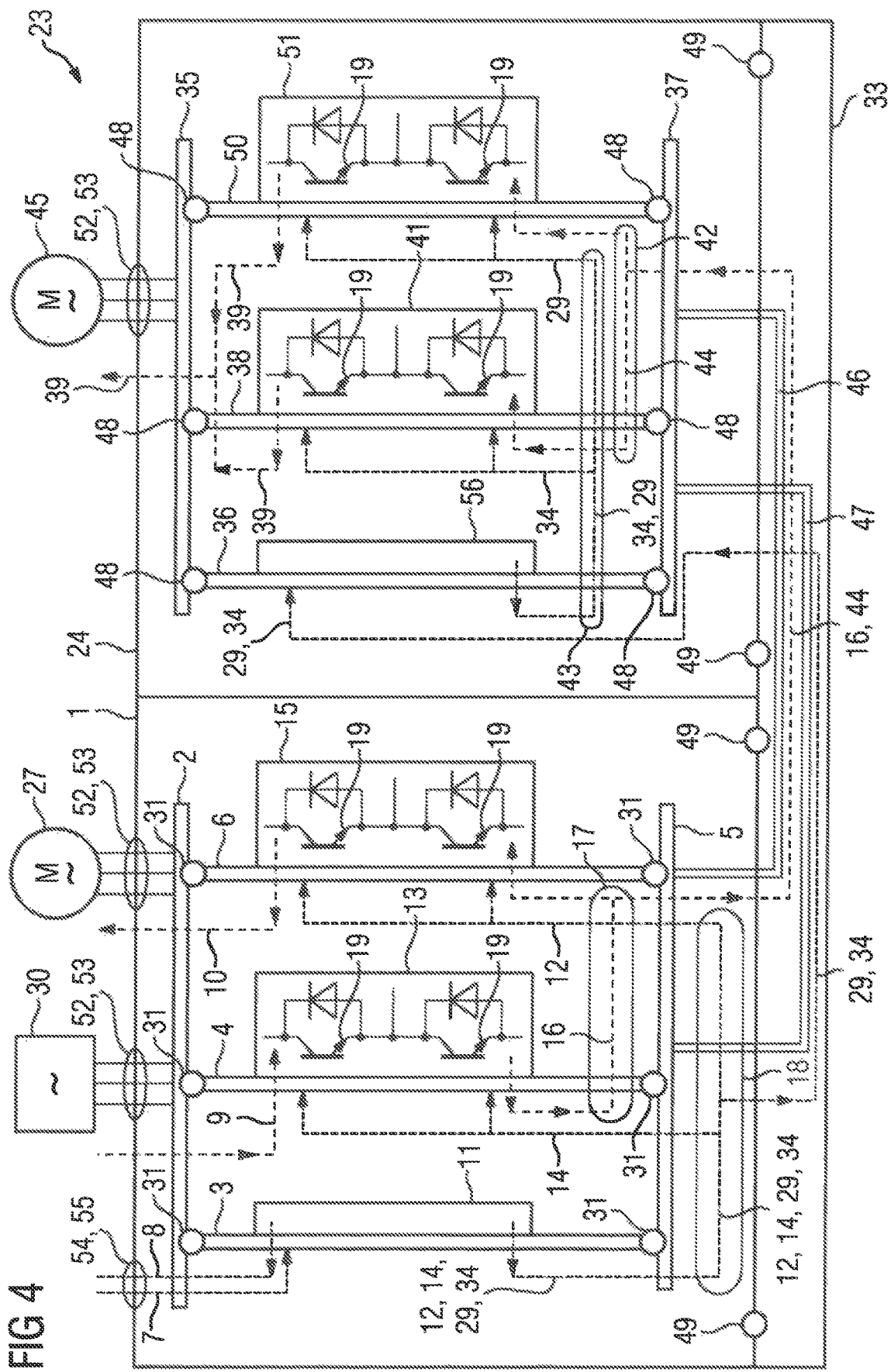
FIG. 4 shows a schematic representation of a modular converter system according to the invention with the modular converter according to FIG. 2 and with a converter expansion module.

FIG. 4 shows a schematic representation of a modular converter system 23 according to the invention with the modular converter 1 according to FIG. 2 and with a converter expansion module 24.

The modular converter 1 of the modular converter system 23 here corresponds to the modular converter 1 shown in FIG. 2 by way of example.

A rear wall bus 33 is electrically connected both to the modular converter 1 and to the converter expansion module 24 by means of releasable mechanical connections 49.

The converter expansion module 24 has a module connection assembly 35, a module coupling assembly 36, a module rear wall assembly 37, a module load assembly 38 and a further module load assembly 50 as module assemblies or converter expansion module components, wherein the module connection assembly 35 and the module rear wall assembly 37 are each electrically connected to the module coupling assembly 36, the module load assembly 38 and the further module load assembly 50 by means of releasable mechanical connections 48.

Via a rear wall bus direct voltage circuit 46 of the rear wall bus 33, an intermediate circuit direct voltage 16 originating from the DC link 17 of the modular converter 1, in the form of a module intermediate circuit direct voltage 44 of the module DC link 42 of the module rear wall assembly 37, is applied to a module inverter 41 of the module load assembly 38, as well as to a further module inverter 51 of the further module load assembly 50.

Fourth control signals 34 for the power semiconductor switches 19 of the module inverter 41 of the module load assembly 38 and/or fifth control signals 29 for the power semiconductor switches 19 of the further module inverter 51 of the further module load assembly 50 can be generated both by the control unit 11 of the control assembly 3 of the modular converter 1 and by a module control unit 56 of the module coupling assembly 36 of the converter expansion module 24.

When the fourth and/or the fifth control signals 34,29 are generated by the control unit 11 of the control assembly 3 of the modular converter 1, they are distributed via the control signal circuit 18 of the rear wall assembly 5 of the modular converter 1, a rear wall bus control signal circuit 47 of the rear wall bus 33 and a module control signal circuit 43 of the module rear wall assembly 37 corresponding to the module inverter 41 (the fourth control signals 34) and/or to the further module inverter 50 (the fifth control signals 29).

When the fourth and/or the fifth control signals 34,29 are generated by the module control unit 56 of the module coupling assembly 36 of the converter expansion module 24, they are distributed via the module control signal circuit 43 of the module rear wall assembly 37 corresponding to the module inverter 41 (the fourth control signals 34) and/or to the further module inverter 50 (the fifth control signals 29).

In the exemplary application in FIG. 4, a common output alternating voltage 39 is generated by the module inverter 41, by means of the fourth control signals 34 for controlling its power semiconductor switch 19, and the further module inverter 51, by means of the fifth control signals 29 for controlling its power semiconductor switch 19.

Both the module inverter 41 and the further module inverter 51 are electrically connected via AC voltage connections 52 and AC voltage lines 53 of the converter expansion module 24 to a module load 45, in this case an electrical three-phase machine, to which the common output alternating voltage 39 is then applied during operation.

The invention claimed is:

1. A modular converter system comprising:
   a modular converter comprising
      an inverter comprising power semiconductor switches made of GaN or InGaN and being operated with a blocking voltage of at least 400V and with a clock frequency of at least 40 kHz,
   a connection assembly configured to distribute an input signal and an output signal and an input alternating voltage and an output alternating voltage,
   a control assembly comprising a control unit configured to generate first control signals for the inverter,
   a supply assembly comprising a rectifier configured to convert the input alternating voltage of a primary network into an intermediate circuit direct voltage,
   a rear wall assembly comprising a DC link and a control signal circuit configured to distribute the intermediate circuit direct voltage and the first control signals for the inverter, and
   a load assembly comprising the inverter configured to convert the intermediate circuit direct voltage into the output alternating voltage for a load or for a secondary network, wherein the connection assembly and the rear wall assembly are electrically connected to the control assembly, the supply assembly and the load assembly by way of releasable mechanical connections, the modular converter system further comprising a rear wall bus, and a converter expansion module having a module connection assembly configured to distribute module input and output signals and a module output alternating voltage, a module coupling assembly or a module control unit of the module coupling assembly in the control unit of the control assembly of the modular converter configured to generate fourth control signals for distribution to a module inverter which comprises semiconductor switches made of GaN or InGaN and operated with a blocking voltage of at least 400V and with a clock frequency of at least 40 kHz, a module rear wall assembly comprising a module DC link circuit and a module control signal circuit which are configured to distribute the module intermediate circuit direct voltage and the fourth control signals for the module inverter, and a module load assembly comprising the module inverter of the module load assembly and configured to convert the module intermediate circuit direct voltage into the module output alternating voltage for a module load or for a module secondary network, wherein the module connection assembly and the module rear wall assembly are electrically connected to the module coupling assembly and the module load assembly by way of releasable mechanical module connections.

2. The modular converter system of claim 1, wherein the intermediate circuit direct voltage of the DC link circuit of the modular converter is distributed by way of the rear wall bus via its rear wall bus direct voltage circuit to the module DC link circuit of the converter expansion module as a module intermediate circuit direct voltage for the module inverter, and the rear wall bus is configured to distribute the fourth control signals by way of a rear wall bus control signal circuit from the control signal circuit of the modular converter to the module control signal circuit of the converter expansion module for the module inverter.

3. The modular converter system of claim 1, wherein the converter expansion module comprises an additional module load assembly with an additional module inverter, and wherein the module connection assembly and the module rear wall assembly are electrically connected to the additional module load assembly by way of the releasable mechanical module connections.

4. The modular converter system of claim 1, wherein the rear wall bus is electrically connected to the electrical converter and the converter expansion module by releasable mechanical rear wall bus connections, and wherein the releasable mechanical module connections and the releasable mechanical rear wall bus connections are designed as screwless plug connections.

5. The modular converter system of claim 1, wherein the control unit of the control assembly generates second control signals for the rectifier, with the control signal circuit of the rear wall assembly distributing the second control signals.

6. The modular converter system of claim 1, the modular converter further comprising a capacitor assembly having the intermediate circuit capacitor and/or a commutation capacitor, wherein the capacitor assembly is electrically connected at least to the rear wall assembly by way of releasable mechanical connections.

7. The modular converter system of claim 1, the modular converter further comprising an EMC (electromagnetic compatibility) assembly having an LC filter circuit, wherein the EMC assembly is electrically connected at least to the connection assembly by way of one of the releasable mechanical connections.

8. The modular converter system of claim 1, the modular converter further comprising an additional supply assembly with an additional rectifier, wherein the additional supply assembly is electrically connected to the connection assembly and to the first rear wall assembly by way of the releasable mechanical connections.

9. The modular converter system of claim 1, the modular converter further comprising an additional load assembly with an additional inverter, wherein the additional load assembly is electrically connected to the connection assembly and to the rear wall assembly by way of the releasable mechanical connections.

10. The modular converter system of claim 9, wherein the inverter of the load assembly and the additional inverter of the additional load assembly jointly operate the load or the secondary network.

11. The modular converter system of claim 9, wherein the inverter of the load assembly operates the load or the secondary network, and the additional inverter of the additional load assembly operates an additional load or an additional secondary network.

12. The modular converter system of claim 1, wherein the releasable mechanical connections are designed as screwless plug connections.

13. The modular converter system of claim 1, wherein the power semiconductor switches of the inverter are configured to operate with a switching current of at least 7A.

14. The modular converter system of claim 1, wherein the power semiconductor switches of the rectifier are configured to operate with a switching current of at least 7A.

* * * * *